United States Patent
Ekkizogloy et al.

(10) Patent No.: US 8,582,978 B2
(45) Date of Patent: Nov. 12, 2013

(54) LOGGING MECHANISM FOR AN INTELLIGENT TRANSMITTER MODULE

(75) Inventors: Luke M. Ekkizogloy, San Jose, CA (US); Henry M. Daghighian, Mountain View, CA (US)

(73) Assignee: Finisar Corporation, Sunnyvale, CA (US)

( * ) Notice: Subject to any disclaimer, the term of this patent is extended or adjusted under 35 U.S.C. 154(b) by 933 days.

(21) Appl. No.: 12/015,240

(22) Filed: Jan. 16, 2008

(65) Prior Publication Data

US 2009/0182531 A1 Jul. 16, 2009

(51) Int. Cl.
*H04B 10/00* (2013.01)

(52) U.S. Cl.
USPC .............. 398/182; 398/136; 398/137

(58) Field of Classification Search
USPC .................... 398/136, 137, 182
See application file for complete search history.

(56) References Cited

U.S. PATENT DOCUMENTS

| | | | |
|---|---|---|---|
| 4,784,454 A | 11/1988 | Dyott | |
| 4,903,262 A | 2/1990 | Dissosway et al. | |
| 5,019,769 A | 5/1991 | Levinson | |
| 5,035,481 A | 7/1991 | Mollenauer | |
| 5,144,632 A | 9/1992 | Thonn | |
| 5,812,572 A | 9/1998 | King et al. | |
| 6,400,737 B1 | 6/2002 | Broulin et al. | |
| 6,512,617 B1 | 1/2003 | Tanji et al. | |
| 6,590,644 B1 | 7/2003 | Coin et al. | |
| 6,618,425 B1 | 9/2003 | Carlesi et al. | |
| 6,898,702 B1 | 5/2005 | Evans | |
| 6,978,624 B2 | 12/2005 | Carlson et al. | |
| 7,215,891 B1 | 5/2007 | Chiang et al. | |
| 7,346,764 B2 | 3/2008 | Moriwaki et al. | |
| 2002/0027688 A1 | 3/2002 | Stephenson | |
| 2002/0078403 A1 | 6/2002 | Gullo et al. | |
| 2002/0097468 A1 | 7/2002 | Mecherle et al. | |
| 2002/0143920 A1 | 10/2002 | Dev et al. | |
| 2003/0053170 A1 | 3/2003 | Levinson et al. | |
| 2003/0128411 A1* | 7/2003 | Aronson et al. | 359/152 |
| 2003/0223756 A1 | 12/2003 | Tatum et al. | |
| 2004/0022537 A1 | 2/2004 | Mecherle et al. | |
| 2004/0022543 A1 | 2/2004 | Hosking et al. | |
| 2004/0028408 A1 | 2/2004 | Cox et al. | |
| 2004/0033079 A1 | 2/2004 | Sheth et al. | |
| 2004/0057730 A1 | 3/2004 | Littlejohn et al. | |
| 2004/0120323 A1 | 6/2004 | Viikari et al. | |
| 2004/0136719 A1 | 7/2004 | Hidai et al. | |
| 2004/0175172 A1 | 9/2004 | Aronson et al. | |
| 2004/0183787 A1 | 9/2004 | Geaghan et al. | |

(Continued)

OTHER PUBLICATIONS

U.S. Appl. No. 10/882,447, filed Jun. 30, 2004, Ekkizogloy et al.

(Continued)

*Primary Examiner* — Nathan Curs (74) *Attorney, Agent, or Firm* — Maschoff Brennan (57) ABSTRACT

An optoelectronic device having an intelligent transmitter module ("ITM") includes a mechanism for logging operational information regarding the ITM. The optoelectronic device includes a microcontroller and a persistent memory. The microcontroller is configured to identify the operational information, and write log information representing the operational information to the persistent memory. The operational information may include statistical data about operation, or may include measured parameters. Log entries may be made periodically and/or in response to events. The log may then be evaluated to determine the conditions under which the ITM has historically operated.

20 Claims, 4 Drawing Sheets

(56) References Cited

U.S. PATENT DOCUMENTS

| | | |
|---|---|---|
| 2005/0017751 A1 | 1/2005 | Gunn et al. |
| 2005/0047778 A1 | 3/2005 | Levinson |
| 2005/0063711 A1 | 3/2005 | Rossi et al. |
| 2005/0078916 A1 | 4/2005 | Hosking |
| 2005/0105915 A1 | 5/2005 | Light |
| 2005/0111845 A1 | 5/2005 | Nelson et al. |
| 2005/0216560 A1 | 9/2005 | Pohja et al. |
| 2005/0223208 A1 | 10/2005 | Moran et al. |
| 2005/0265717 A1 | 12/2005 | Zhou |
| 2005/0282413 A1 | 12/2005 | Israel et al. |
| 2006/0002707 A1 | 1/2006 | Ekkizogloy et al. |
| 2006/0002708 A1 | 1/2006 | Hahin |
| 2006/0002709 A1* | 1/2006 | Dybsetter et al. ............. 398/135 |
| 2006/0002710 A1* | 1/2006 | Dybsetter et al. ............. 398/135 |
| 2006/0018664 A1 | 1/2006 | Levinson et al. |
| 2006/0034612 A1 | 2/2006 | Yu et al. |
| 2006/0098699 A1 | 5/2006 | Sanchez |
| 2006/0147215 A1* | 7/2006 | Hahin et al. ................. 398/135 |
| 2007/0280591 A1* | 12/2007 | Nelson et al. .................... 385/24 |
| 2008/0292311 A1* | 11/2008 | Daghighian et al. .............. 398/9 |

OTHER PUBLICATIONS

U.S. Appl. No. 10/883,208, filed Jun. 30, 2004, Habin et al.
U.S. Appl. No. 10/883,209, filed Jun. 30, 2004, Dybsetter et al.
U.S. Appl. No. 11/220,770, filed Sep. 7, 2005, Ekkizogloy et al.
U.S. Appl. No. 11/468,246, filed Aug. 29, 2006, Dybsetter et al.
U.S. Appl. No. 10/883,209, filed Aug. 5, 2005, Office Action.
U.S. Appl. No. 10/883,209, filed Mar. 24, 2006, Final Office Action.
U.S. Appl. No. 10/883,209, filed Apr. 10, 2007, Office Action.
U.S. Appl. No. 10/883,209, filed Oct. 30, 2007, Office Action.
U.S. Appl. No. 10/883,209, filed Jun. 9, 2008, Final Office Action.
U.S. Appl. No. 11/220,770, filed Apr. 16, 2008, Office Action.
U.S. Appl. No. 11/468,246, filed Sep. 10, 2009, Notice of Allowance.
U.S. Appl. No. 11/468,246, filed Mar. 19, 2009, Office Action.
U.S. Appl. No. 11/220,770, filed Aug. 12, 2009, Office Action.
U.S. Appl. No. 11/220,770, filed Oct. 29, 2008, Office Action.
U.S. Appl. No. 10/883,209, filed Nov. 21, 2008, Notice of Allowance.
U.S. Appl. No. 60/607,538, filed Sep. 7, 2004, Ekkizogloy.
U.S. Appl. No. 60/717,594, filed Sep. 16, 2005, Hahin.
U.S. Appl. No. 10/883,209, filed Oct. 8, 2008, Notice of Allowance.
U.S. Appl. No. 11/220,770, filed Sep. 13, 2010, Office Action.
U.S. Appl. No. 11/220,770, filed Mar. 30, 2010, Office Action.
U.S. Appl. No. 10/883,208, filed Mar. 8, 2007, Office Action.
U.S. Appl. No. 10/883,208, filed Oct. 30, 2007, Office Action.
U.S. Appl. No. 10/883,208, filed Apr. 16, 2008, Office Action.
U.S. Appl. No. 10/883,208, filed Dec. 5, 2008, Office Action.
U.S. Appl. No. 10/883,208, filed Jul. 21, 2009, Office Action.
U.S. Appl. No. 10/883,208, filed Jan. 7, 2010, Notice of Allowance.
U.S. Appl. No. 10/882,447, filed Jun. 7, 2005, Office Action.
U.S. Appl. No. 10/882,447, filed Mar. 20, 2006, Office Action.
U.S. Appl. No. 10/882,447, filed Mar. 13, 2007, Office Action.
U.S. Appl. No. 10/882,447, filed Sep. 28, 2007, Office Action.
U.S. Appl. No. 10/882,447, filed May 12, 2008, Office Action.
U.S. Appl. No. 10/882,447, filed Nov. 17, 2008, Notice of Allowance.
U.S. Appl. No. 11/220,770, filed Dec. 15, 2010, Office Action.
U.S. Appl. No. 11/220,770, filed Aug. 18, 2011, Office Action.

* cited by examiner

LOGGING MECHANISM FOR AN INTELLIGENT TRANSMITTER MODULE

CROSS-REFERENCE TO RELATED APPLICATIONS

Not Applicable.

BACKGROUND OF THE INVENTION

1. The Field of the Invention

The present invention relates generally to optoelectronic devices. More specifically, the present invention relates to an optoelectronic device that performs persistent logging of operational information regarding an intelligent transmitter module within the optoelectronic device.

2. The Relevant Technology

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed there through, the intensity of the emitted light being a function of the current magnitude. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a driver (e.g., referred to as a "laser driver" when used to drive a laser signal) configured to control the operation of the optical transmitter in response to various control inputs. The optical transceiver also generally includes an amplifier (e.g., often referred to as a "post-amplifier") configured to perform various operations with respect to certain parameters of a data signal received by the optical receiver. A controller circuit (hereinafter referred to as the "microcontroller") controls the operation of the laser driver and post amplifier.

The operation of the optical transceiver is susceptible to its operating environment and to its other operational parameters. One obvious example is the laser bias current. If the transmitter bias current drifts upwards or downwards, a variation in the optical intensity generated by the transmitter may be expected. The transmitted optical power and the received optical power are also important operational parameters. The supply voltage level provided to the optical transceiver also affects its performance.

In addition, temperature can change the operating characteristics of the optical transmitter itself. In particular, the wavelength output of a laser may drift from approximately 0.3 nanometers (nm) to approximately 0.6 nm for every one degree Celsius change in temperature. Since lasers generate heat during operation, this can have a significant effect upon the operation of the laser. Wavelength variations can cause crosstalk, where one transmission becomes confused with another. Furthermore, varying wavelengths due to varying laser temperature may cause different fiber attenuations. Accordingly, laser temperature and wavelength have great influence over the proper operation of the optical transceiver.

High temperatures of the optical transceiver itself or of subassemblies within the optical transceiver may cause temporary or even permanent malfunctioning of not just the laser, but the other electronic components within the optical transceiver or subassembly. Accordingly, the temperature of the optical transceiver or subassembly as a whole is also important to the operation of the optical transceiver.

In order to provide proper cooling or heating to the optical transceiver and/or laser, Thermo Electric Coolers (TECs) are often employed, particularly in optical transceivers whose performance is highly temperature-dependent. Such TEC coolers heat or cool depending on the direction and magnitude of current applied to the TEC coolers. Accordingly, the TEC current is also an important operational parameter.

These various parameters (e.g., laser bias current, transmit power, receive power, supply voltage, laser wavelength, laser temperature, transceiver temperature, and TEC current, and the like) are thus important to the operation of the optical transceiver. However, after an optical transceiver malfunctions, it is often difficult to diagnose what the problem has been since there is no conventional mechanism for persistently logging important events that may give an indication as to why the transceiver malfunctioned. For example, if an optical transceiver has an upper temperature rating of 85 degrees Celsius, the optical transceiver may malfunction or even permanently break if its temperature reaches 110 degrees Celsius. Yet, after the fact, it may be difficult to discover that the optical transceiver was subjected to improper temperatures.

Therefore, what would be advantageous is a mechanism for persistently logging events that are important to the operation of an optical transceiver so that these events may be later used to understand the conditions under which the optical transceiver operated.

BRIEF SUMMARY OF THE INVENTION

The foregoing problems with the prior state of the art are overcome by the principles of the present invention. The principles of the present invention may be implemented in an optoelectronic device configured to transmit and receive optical signals. The optoelectronic device includes an Intelligent Transmitter Module (ITM), which is similar to a TOSA but with additional components, a microcontroller and a persistent memory. The microcontroller and the persistent memory can be integrated within the ITM. The microcontroller is configured to identify operational information regarding the intelligent transmitter module, and write log information representing the operational information to the persistent memory.

The operational information may include operational data such as, for example, the total operational time of the ITM, a number of times the ITM has been booted, an average operational time between boots, a total number of error conditions encountered in the ITM, an identification of one or more error conditions encountered in the ITM, a categorization of the number of error conditions encountered in the ITM for a plurality of different error types, an end of life calculation for the ITM, and the like or any combination thereof. The operational information may also include operational measurements along with the time of measurement. The measured items may include a laser wavelength, a laser temperature, a supply voltage, an intelligent transmitter module temperature, an optical spectrum reshaper temperature, a laser bias current measurement, a Thermo Electric Cooler (TEC) current measurement, a transmit power measurement, and the like or any combination thereof. For a given operational parameter, the log entries may be made periodically, and/or in response to certain events.

Since the operational information is recorded to persistent memory, the persistent memory may be evaluated after a failure of the ITM or optoelectronic device, to properly diagnose the operational circumstances surrounding the failure. This may be important for optoelectronic devices such as transceivers and transponders, which are highly sensitive to environmental and operational conditions. In one embodiment, the persistent memory is on a single chip that may be communicated with using a known interface. For example, the persistent memory may be an EEPROM that may be communicated with using, for example, I²C.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Embodiments of the invention relate to an optoelectronic device configured to transmit and receive optical signals. The optoelectronic device includes a microcontroller, a persistent memory, and an intelligent transmitter module (ITM). An ITM according to embodiments of the invention is a TOSA-like module having an optical transmitter. Additionally, the ITM includes clock and data recovery, a driver, and at least one of the microcontroller and a linear amplifier. The microcontroller is configured to identify operational information regarding the ITM, and write log information representing the operational information to the persistent memory. The operational information may include statistical data about ITM operation, or may include measured parameters. Log entries may be made periodically and/or in response to events. The log may then be retrieved and evaluated to determine the conditions under which the device has historically operated.

The present invention can be implemented in various optoelectronic devices. As used herein, the term "optoelectronic device" includes devices having both optical and electrical components. Examples of optoelectronic devices include, but are not limited to transponders, transceivers, transmitters, and/or receivers. Optoelectronic devices can be used, for example, in telecommunications networks, local area networks, metro area networks, storage area networks, wide area networks, and the like.

Figure 1:
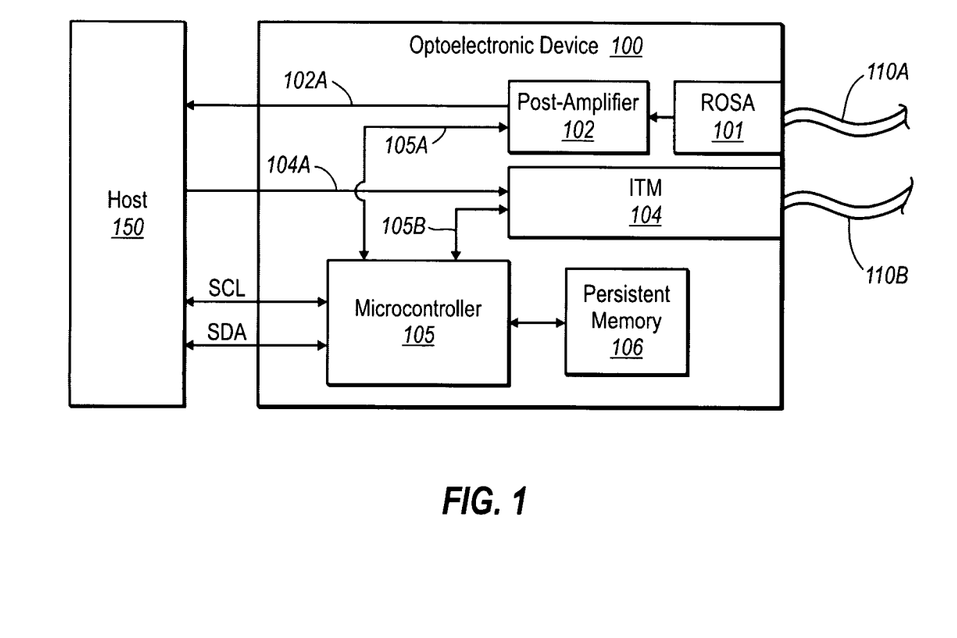
FIG. 1 schematically illustrates an example of an optoelectronic device that may implement features of the present invention.

FIG. 1 illustrates an optoelectronic device 100 in which the principles of the present invention may be employed. While the optoelectronic device 100 will be described in some detail, the optoelectronic device 100 is described by way of illustration only, and not by way of restricting the scope of the invention. The principles of the present invention allow for persistent logging of operational information of an optoelectronic device. This will become increasingly important for faster bit rates transfers. Accordingly, the principles of the present invention are suitable for 1 G, 2 G, 4 G, 8 G, 10 G and higher data rate fiber optic links as sensitivity to operational circumstances increases. Furthermore, the principles of the present invention may be implemented in laser transmitter/receivers of any form factor such as XFP, SFP and SFF, without restriction. Having said this, the principles of the present invention are not limited to a laser transceiver environment at all. For instance, the principles of the present invention can also be implemented in a 200 pin or 300 pin transponder environment and in other environments as well.

The optoelectronic device 100 receives an optical signal from fiber 110A using receiver optical subassembly ("ROSA") 101. The ROSA 101 includes an optical receiver that acts as an optoelectric transducer by transforming the optical signal into an electrical signal. The ROSA 101 provides the resulting electrical signal to a post-amplifier 102. The post-amplifier 102 amplifies the signal and provides the amplified signal to a host 150 as represented by arrow 102A. While not illustrated, the optoelectronic device may additionally include a receive clock and data recovery circuit ("RX CDR") following the post-amplifier 102 to equalize and retime the amplified signal prior to providing it to the host 150.

The optoelectronic device 100 may also receive electrical signals from the host 150 for transmission onto the fiber 110B. Specifically, intelligent transmitter module (ITM) 104 receives the electrical signal as represented by the arrow 104A, processes it in a manner to be described more fully below, and emits onto the fiber 110B optical signals representative of the information in the electrical signal provided by the host.

Figure 2A:
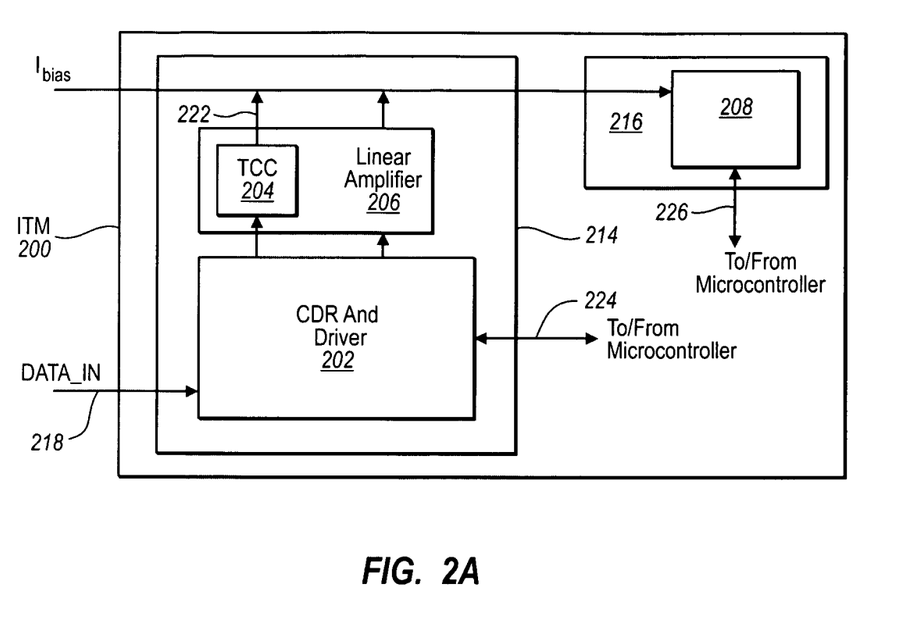
FIGS. 2A and 2B illustrate embodiments of an intelligent transmitter module that may be implemented in the optoelectronic device of FIG. 1.
Figure 2B:
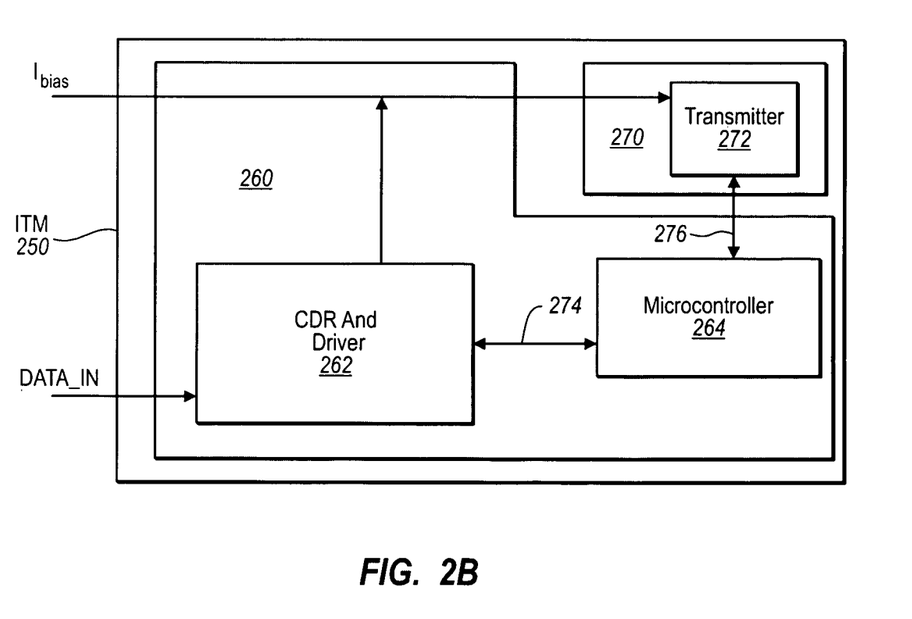

Briefly, an ITM is a TOSA-like module including an optical transmitter. Additionally, an ITM includes a CDR, a driver, and at least one of a linear amplifier and a microcontroller. Two embodiments of an ITM are illustrated in FIGS. 2A and 2B. In the embodiment of FIG. 2A, ITM 200 includes a CDR and driver chip 202, thermal chirp compensation ("TCC") circuit 204, linear amplifier chip 206, and optical transmitter 208. The electronic components are mounted on a first substrate 214 while the transmitter is mounted on a second substrate 216.

Figure 3:
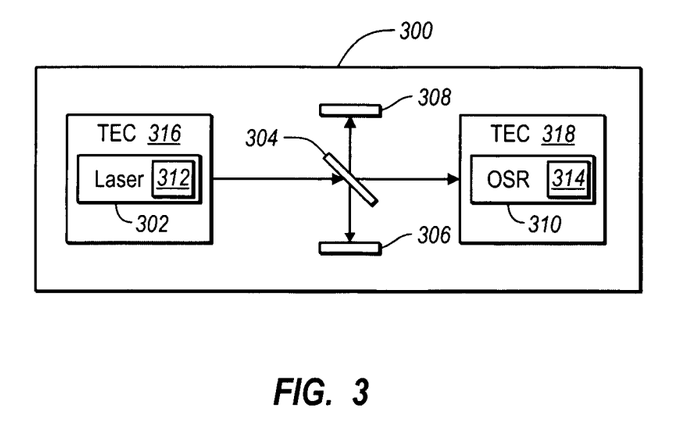
FIG. 3 illustrates one embodiment of a laser with chirp that is managed that may be implemented in the intelligent transmitter module of FIG. 2A.

In the present embodiment, the transmitter 208 comprises a laser with managed chirp, illustrated in FIG. 3 as module 300. The primary components of the module 300 are an optical signal source 302 such as a distributed feedback (DFB) laser and an optical spectrum reshaper ("OSR") 310 or multi-cavity etalon filter. Basically, the OSR 310 converts a frequency modulated signal of the optical signal source 302 to an amplitude modulated signal and additionally introduces phase correlation between the bits of the signal.

The laser with managed chirp 300 may additionally include supporting optics and various electronic components. The supporting optics include a beam splitter 304 and power and wavelength detecting photodiodes 306 and 308. The electronic components include a first thermistor 312 for monitoring the temperature of the laser 302, a second thermistor 314 for monitoring the temperature of the OSR 310, a first TEC 316 for regulating the temperature of the laser 302, and a second TEC 318 for regulating the temperature of the OSR 310.

Returning to FIG. 2A, the operation of the ITM 200 will now be described. The ITM 200 receives an electrical signal 218 from a host and equalizes and retimes the signal at a CDR stage of the CDR and driver 202. The equalized and retimed signal is provided to a driver stage of the CDR and driver 202 which generates a modulation current. The modulation current is amplified by linear amplifier 206, coupled in to a laser bias current 220, and used to drive the laser with managed chirp 208 to emit optical signals representative of the information in the electrical signal 218 provided by the host.

Whereas the laser with managed chirp 208 may be subject to thermal chirp, the TCC circuit 204 compensates by identifying high concentrations of 1 bits or 0 bits in the incoming electrical signal 218 and generating a compensation current 222 which is coupled in to the bias current 220.

Settings adjustments can be made to the electronic components 202, 204, 206 and the laser 208 with chirp that is managed by a microcontroller to optimize the performance of the ITM 200 using control lines 224, 226. Additionally, the microcontroller may use the control lines 224, 226 to obtain operational data from the electronic components and the laser with managed chirp, which can then be stored to a persistent memory, described more fully below.

FIG. 2B illustrates a second embodiment of an ITM 250. The ITM 250 includes a CDR and driver chip 262 and a microcontroller 264 mounted on a first substrate 260. While shown as separate components, the CDR and driver 262 and microcontroller 264 may alternatively be integrated in the same chip. The ITM 250 also includes a transmitter 272 mounted on a second substrate 270. In the present embodiment, the transmitter 272 comprises a VCSEL capable of being driven by the driver stage of the CDR and driver 262, without the need for a linear amplifier as used in FIG. 2A.

In the present embodiment, the microcontroller 264 can make settings adjustments and log operational data from within the ITM 250 using control lines 274, 276. Accordingly, persistent memory for storing the logged operational data may additionally be included within the ITM 250, or it may be provided in a location of an optoelectronic device external to the ITM 250.

It is understood that the embodiments of FIGS. 2A and 2B are provided for illustration only and should not be construed to limit the invention. Various changes/modifications can be made while still applying the principles of the invention. For instance, a microcontroller can additionally be included on the first substrate 214 of the ITM 200 of FIG. 2A. The microcontroller can be separate from the CDR and driver 202 or it can be integrated in the same chip as the CDR and driver 202. Alternately or additionally, a linear amplifier and/or TCC circuit can be included on the first substrate 260 of the ITM 250 of FIG. 2B. Alternately or additionally, each of the optical transmitters 208, 272 of FIGS. 2A and 2B may comprise an optical transmitter having any suitable configuration, including, but not limited to a VCSEL, a laser with managed chirp, a DFB laser, a cooled or uncooled externally modulated laser ("EML"), an EML with a wavelocker, a cooled or uncooled directly modulated laser ("DML"), a DML with a wavelocker, and the like or any combination thereof. Alternately or additionally, a wireless transceiver module may be included within the ITM 250 for communicating wirelessly with the ITM 250.

The integration of electronic components within the ITMs 200, 250 has numerous advantages over a conventional TOSA where the electronic components are external to the TOSA. For instance, signal quality can be improved, power consumption can be reduced, real estate can be made available for additional components, and EMI containment can be improved. Embodiments of an intelligent transmitter module and the benefits obtained therefrom are discussed more fully in U.S. patent application Ser. No. 11/968,581, entitled INTELLIGENT TRANSMITTER MODULE, filed Jan. 2, 2008, now U.S. Pat. No. 8,019,225 issued on Sep. 13, 2011, which patent is herein incorporated by reference in its entirety.

Returning to FIG. 1, the behavior of the ROSA 101, the post-amplifier 102, and the components of the ITM (such as a CDR and driver, linear amplifier, and optical transmitter) may vary dynamically due to a number of factors. For example, temperature changes, power fluctuations, and feedback conditions may each affect the performance of these components. Accordingly, the optoelectronic device 100 includes a microcontroller 105, which evaluates temperature and voltage conditions and other operational circumstances, and receives information from the post-amplifier 102 (as represented by arrow 105A) and from the components of the ITM 104 (as represented by arrow 105B). This will allow the microcontroller 105 to counteract the dynamically varying performance, and detect when there is a loss of signal.

Specifically, the microcontroller 105 may counteract these changes by adjusting settings on the post-amplifier 102 and/or the components of the ITM 104 as represented by the arrows 105A and 105B. These settings adjustments are quite intermittent since they are only made when temperature or voltage or other low frequency changes so warrant.

The microcontroller 105 has access to a persistent memory 106, which in one embodiment, is an Electrically Erasable and Programmable Read Only Memory (EEPROM). Data and clock signals may be provided from the host 150 to the microcontroller 105 using the serial clock line SCL, and the serial data line SDA. Also data may be provided from the microcontroller 105 to the host using serial data line SDA to allow for digital diagnostics and readings of temperature levels, transmit/receiver power levels, and the like.

Note that in the embodiment of FIG. 1, the ITM 104 may correspond to the ITM 200 illustrated in FIG. 2A, wherein the ITM 200 does not include a microcontroller, the microcontroller being external to the ITM as illustrated in FIG. 1. Alternately or additionally, the microcontroller 105 and/or persistent memory 106 may be integrated within the ITM 104 as illustrated in FIG. 2B. In this case, one skilled in the art will appreciate that various changes to the microcontroller 105 can be made. For instance, if the microcontroller 105 is integrated within the ITM 104, it may be configured to not retrieve data from or make adjustments to the post-amplifier 102. Instead, the microcontroller can be configured to retrieve data from and make adjustments to some or all of the components within the ITM. Additionally, the SCL and SDA lines may be provided from the host to the microcontroller within the ITM 104 via feedthroughs or the like, or the SCL and SDA lines can be omitted.

Figure 4:
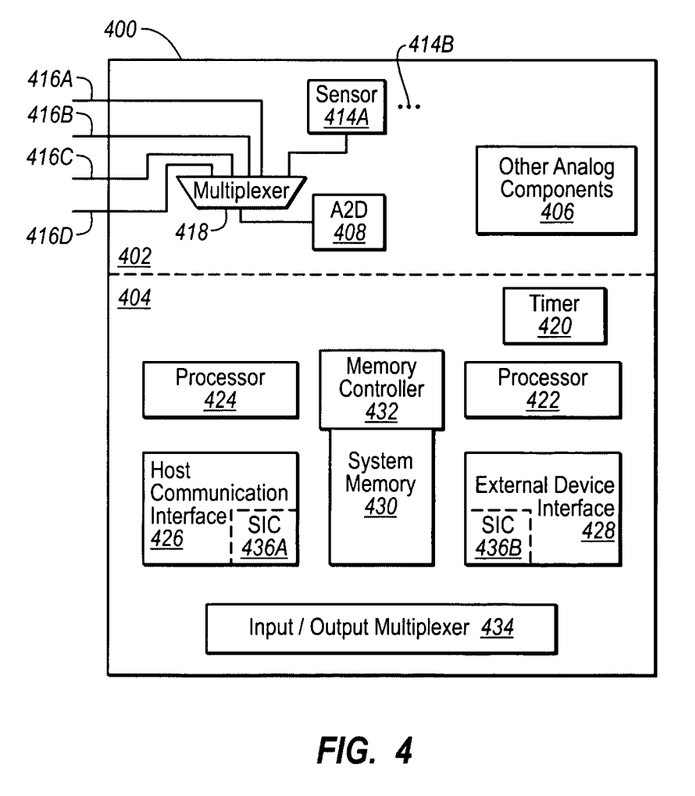
FIG. 4 schematically illustrates an example of a microcontroller of FIG. 1.

Returning to FIG. 1, in one embodiment the microcontroller 105 includes both an analog portion and a digital portion. Together, they allow the microcontroller to implement logic digitally, while still largely interfacing with the rest of the optoelectronic device 100 using analog signals. FIG. 4 schematically illustrates an example 400 of the microcontroller 105 in further detail. The microcontroller 400 includes an analog portion 402 and a digital portion 404.

The analog portion 402 may contain digital to analog converters, and analog to digital converters, high speed comparators (e.g., for event detection), voltage based reset generators, voltage regulators, voltage references, clock generator, and other analog components. For example, the analog portion includes sensor 414A amongst potentially others as represented by the horizontal ellipsis 414B. Each of these sensors may be responsible for measuring operational parameters that may be measured from the microcontroller 400 such as, for example, supply voltage, optoelectronic device temperature, and/or ITM temperature. The microcontroller may also receive external analog or digital signals from other components within the optoelectronic device that indicate other measured parameters such as, for example, laser bias current, transmit power, receive power, laser wavelength, laser temperature, OSR temperature, and TEC current (e.g. for the laser TEC 316 and/or OSR TEC 318 of FIG. 3). Four external lines 416A, 416B, 416C, and 416D are illustrated for receiving such external analog signals although there may be many of such lines.

The internal sensors 414A-414B may generate analog signals that represent the measured values. In addition, the externally provided signals 416A-416D may also be analog signals. In this case, the analog signals are converted to digital signals so as to be available to the digital portion 404 of the microcontroller 400 for further processing. Of course, each analog parameter value may have its own Analog to Digital Converter ("A2D"). However, to preserve chip space, each value may be periodically sampled in a round robin fashion using a single A2D such as the illustrated A2D 408. In this case, each analog value may be provided to a multiplexer 418, which selects in a round robin fashion, one of the analog signals at a time for sampling by the A2D 408.

As previously mentioned, the analog portion 402 of the microcontroller 400 may also include other analog components 406 such as, for example, digital to analog converters, other analog to digital converters, high speed comparators (e.g., for event detection), voltage based reset generators, voltage regulators, voltage references, clock generator, and other analog components. In one embodiment, the high speed comparators may be supplied with one input being from an internal sensor or from an external line to receive a measured parameter value. The other input to the comparator may be a comparison value. Should the measured parameter value exceed the comparison value, the comparator may generate a logical high (or low) which indicates that the event has occurred. For example, suppose that the standard maximum optoelectronic device temperature is 85 degrees Celsius. The actual measured device temperature may be provided as one input to a comparator, while a value representing 85 degrees Celsius is provided to the other input of the comparator.

The digital portion 404 of the microcontroller 400 may include a timer module 420 that provides various timing signals used by the digital portion 404. Such timing signals may include, for example, programmable processor times. The timer module 420 may also act as a watchdog timer.

Two general-purpose processors 422 and 424 are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 422 and 424 are each a 16-bit processor and may be identically structured. The precise structure of the instruction set is not important to the principles of the present invention as the instruction set may be optimized around a particular hardware environment, and as the precise hardware environment is not important to the principles of the present invention.

A host communications interface 426 is used to communicate with the host using the serial clock line SCL and the serial data line SDA of the optoelectronic device 100. An external device interface 428 is used to communicate with, for example, other modules within the ITM 104 and/or optoelectronic device 100 such as, for example, the CDR and driver 202, 262, post-amplifier 102, or the persistent memory 106.

Internal system memory 430 (not to be confused with the external persistent memory 106) is provided which may be Random Access Memory (RAM). The memory controller 432 shares access to the system memory 430 amongst each of the processors 422 and 424 and with the host communication interface 426 and the external device interface 428. In one embodiment, the host communication interface 426 includes a serial interface controller 436A, and the external device interface 428 includes a serial interface controller 436B. The two serial interface controllers 436A and 436B may communicate using a two-wire interface such as I²C or another serial interface (e.g., SPI, MDIO, 1-wire, and the like) so long as the interface is recognized by both communicating modules. One serial interface controller (e.g., serial interface controller 436B) is a master component, while the other serial interface controller (e.g., serial interface controller 436A) is a slave component.

An input/output multiplexer 434 multiplexes the various input/output pins of the microcontroller 400 to the various components within the microcontroller 400. This enables different components to dynamically assign pins in accordance with the then-existing operational circumstances of the chip. Accordingly, there may be more input/output nodes within the microcontroller 400 than there are pins available on the microcontroller 400, thereby reducing the footprint of the microcontroller 400.

In order to log operational information, microcontroller 400 executes microcode received from a source. Specifically, processors 422 and 424 load microcode from the source into the system memory 430. For example, the processors 422 and 424 may load microcode stored in persistent memory 106 into system memory 430. The microcode from persistent memory 106 may include functions that direct which device operational parameters to measure. Alternatively, the microcode may be provided by the host 150, delivered to microcontroller 105 over serial data line SDA or other implemented host interface. According to this embodiment, a user can customize the logged information by, e.g., choosing a particular microcode function from a library of different microcode functions stored on the host 150. In addition, host 150 may be connected to the Internet or some other wide area network, allowing processors 422, 424 to acquire microcode from a remote source.

Figure 5:
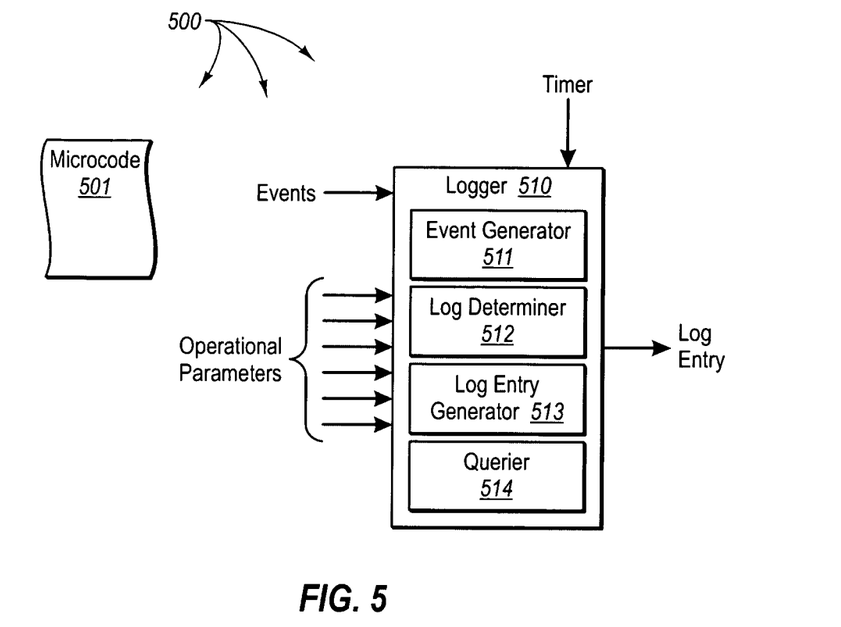
FIG. 5 illustrates a software architecture that may be maintained in system memory during run-time in accordance with the principles of the present invention.

FIG. 5 illustrates a software architecture 500 that may be instantiated in system memory 430 when microcode is executed. In particular, the processors 422, 424 load microcode 501 from any of the sources previously discussed into the system memory 430. The processors 422, 424 then execute the microcode instructions 501. This causes the microcode to form a functional logger object 510 in system memory. Alternatively, the microcode 501 may be directly executed from persistent memory. In that case, the microcode 501 is loaded into the system memory a fraction at a time (e.g., one instruction at a time) for execution by the processor. In this latter case, the system memory may be a register, flip-flops, or any other memory regardless of size or type.

The logger object 510 has access to various operational parameters of the optoelectronic device for example, from the A2D 408 or from the external lines 416A-416D. The logger 510 also may have access to events such as the events generated by the high-speed comparators mentioned above. The logger 510 may also generate its own internal events as represented by events generator 511 based on an evaluation of one or more of the operational parameters. A log determiner 512 identifies what operational information should be logged, and when. A log entry generator 513 generates the log entries. A queries component 514 may be used to query various portions of the optoelectronic device for operational parameters. The logger 510 may also have access to timing signals.

Figure 6:
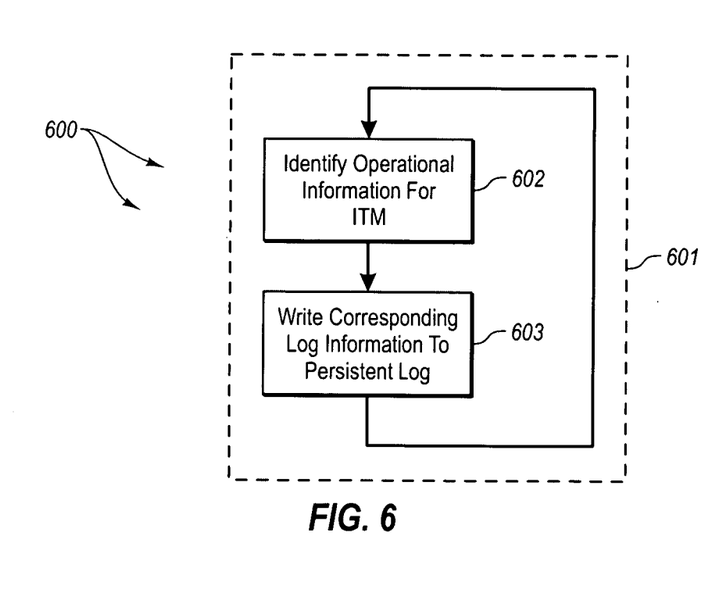
FIG. 6 illustrates a method for logging operational information in accordance with the principles of the present invention.

FIG. 6 illustrates a flowchart of a method 600 for an optoelectronic device to persistently log operational data. The optoelectronic device executes 601 microcode, which may correspond to the microcode 501 of FIG. 5, from system memory. The executed microcode causes the optoelectronic device to perform the logging operation, which may be repeated numerous times during operation.

After execution of the microcode, the optoelectronic device identifies 602 which operational parameters for the ITM 104 to log. For example, a functional logger, which may correspond to functional logger 510, is created in system memory as discussed. The functional logger identifies which optoelectronic device parameters to log. For example, the parameters to log may be identified by a default setting determined by the microcode instruction (e.g., microcode 501) loaded into the system memory 430. The default setting may indicate that all optoelectronic device parameters are to be logged. Alternatively, the default setting may indicate that only certain operational parameters, for instance fluctuations of temperature, are to be logged. Additionally, the parameters to log may be identified by customized instructions from the host. For example, the host 150 may be equipped with a keyboard, mouse, or other user interface that allows a user to choose which parameter to measure.

The logger may also be directed to log data based on a processed result, such as the current run time. The logger may also receive instructions providing conditions as to when to log data. For instance, if the persistent memory is less than 80% full, then the log condition may specify that all data is logged, or if the persistent memory is greater than 80% full, then the log condition may specify that a specific operational parameter is logged.

The operational information that may be logged for the ITM 104 and/or for the optoelectronic device 100 may include statistical information such as, for example, a total operational time, an average operational time between boots, a total number of error conditions encountered, an identification of one or more error conditions encountered, a categorization of the number of error conditions encountered for a plurality of different error types, a number of times the ITM or optoelectronic device has been booted, or the like. The operational information may also simply record operational parameters measured for the ITM 104 and/or optoelectronic device 100 along with an approximate time of measurement. Such operational parameters may include, for example, a laser wavelength approximation, a laser temperature measurement, a supply voltage measurement, an ITM temperature measurement, an OSR temperature measurement, a laser bias current measurement, a Thermo Electric Cooler (TEC) current measurement, a transmit power measurement, an acceleration measurement, a peak acceleration measurement, or the like. The operational parameters may be periodically queried using the querier 514 in response to timing signals, or may be identified in response to an event either generated internal to the logger 510 or accessed external to the logger 510.

Additional statistical information regarding an end of life for the ITM 104 and/or optoelectronic device 100 may be logged. For example, the end of life information may include calculations using statistical models based on operational parameters that calculate the increasing likelihood of ITM or device failure as the ITM and device age. Use of the calculation advantageously allows a user the ability to optimally replace an aging ITM or device with minimal loss of use of the ITM or device.

Once the operational information is identified, the optoelectronic device is configured by the executed microcode to write 603 log information representing the operational information to persistent memory within the optoelectronic device. Alternately or additionally, the microcode may direct that at least some portion of the logged information be sent over the SDA line or other host interface to host memory for storage, allowing user access and evaluation of the information. When the logged information is written to memory of the host 150 and to persistent memory 106, this allows retrieval and evaluation of the stored data from either memory source and creates a backup should one of the memory sources become disabled.

The persistent memory 106 may be integrated with the microcontroller 105 on the same chip. However, this need not be the case. If the persistent memory 106 was a separate module such as, for example, an EEPROM module, the persistent memory 106 may be unplugged from the optoelectronic device 100 to evaluate its memory contents. For example, if a failure were to occur, the various log entries could be evaluated to identify possible causes for the optoelectronic device failing. For example, if an event was recorded indicating that the optoelectronic device experienced a peak acceleration exceeding 20 times the acceleration imposed by gravity (often referred to as "G's"), then one might infer that the optoelectronic device had been dropped. Alternatively, the persistent memory 106 could be evaluated without removal from the optoelectronic device if the optoelectronic device has an external I/O interface that allows the persistent memory to be read.

Logged information can be useful in evaluating ITM failure since, similar to a conventional TOSA, an ITM is hermetically sealed in a typical embodiment. Because an ITM includes many more components than a conventional TOSA, diagnosing ITM failure without logged information would typically require opening the hermetically sealed ITM package and testing the individual components. Opening the hermetically sealed package is itself a challenge, but testing the individual components may be especially difficult where some of the components are integrated on the same chip and/or where distances between components are small, requiring specialized (and usually expensive) test equipment. Consequently, opening the ITM package and testing individual components may be unrealistic in evaluating ITM operation.

The logging of operational information therefore enables evaluation of an ITM without the burden of opening and individually testing the components of the ITM. The logged information can be retrieved using an I/O interface external to the optoelectronic device in the embodiment of FIG. 1. Similarly, an I/O interface external to the optoelectronic device can be used to retrieve logged information from persistent memory within the optoelectronic device even if the microcontroller is integrated within the ITM if the persistent memory to which information is logged is external to the ITM. If, however, the microcontroller and persistent memory are integrated within the ITM, an I/O interface external to the ITM can be provided to permit reading of the logged information. Such an I/O interface external to the ITM may comprise, for example, a wired serial interface, or a wireless interface, in which case the ITM may include a wireless transceiver.

Accordingly, the principles of the present invention provide for an optoelectronic device that persistently logs operational information regarding an ITM within the optoelectronic device. Should a failure occur (even a power failure), this persistent log may be evaluated to identify the cause of the failure. Power need not be supplied to the optoelectronic device in order to preserve the log entries once the log entries are written since the log entries are written to non volatile memory. Accordingly, the principles of the present invention represent a significant advancement in the art of optoelectronic devices.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired and wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. In an optoelectronic device having an intelligent transmitter module, a method of logging information regarding operational circumstances of the intelligent transmitter module, the method comprising:
   executing microcode from system memory of an optoelectronic device, the microcode being structured such that when executed by at least one processor of the optoelectronic device, it directs the optoelectronic device to measure one or more device operational parameters of an intelligent transmitter module, and causes the optoelectronic device to perform the following:
      an act of identifying operational information of the intelligent transmitter module of the optoelectronic device based on measured device operational parameters as directed by the microcode, the intelligent transmitter module comprising an hermetically sealed package including disposed therein an optical transmitter, a clock and data recovery circuit, and a driver integrated in a same chip as the clock and data recovery circuit;
      an act of forming a functional logger object in the system memory, wherein the functional logger object has access to the device operational parameters; and
      an act of writing log information representative of the operational information in at least one storage location.

2. The method of claim 1, wherein the at least one storage location comprises a host computing system to which the optoelectronic device is communicatively coupled.

3. The method of claim 1, wherein the at least one storage location comprises persistent memory within the optoelectronic device.

4. The method of claim 3, wherein the log information is retrieved from the persistent memory after failure of the intelligent transmitter module via an input/output interface external to the optoelectronic device.

5. The method of claim 1, wherein the information is used to diagnose operational failures in the intelligent transmitter module.

6. The method of claim 1, wherein the device operational parameters represents one or more of: a total operation time for the intelligent transmitter module, a number of times the intelligent transmitter module has been booted, an average operational time between boots, a total number of error conditions encountered in the intelligent transmitter module, an identification of one or more error conditions encountered in the intelligent transmitter module, a categorization of the number of error conditions encountered in the intelligent transmitter module for a plurality of different error types, a supply voltage measurement, a laser wavelength approximation, a laser bias current measurement, a thermo electric cooler current measurement, a laser temperature measurement, an optical spectrum reshaper temperature measurement, a transmit power measurement, an acceleration measurement, a peak acceleration measurement, and an end of life calculation.

7. An optoelectronic device in accordance with claim 1, wherein the functional logger object comprises:
an event generator that generates internal events based on an evaluation of one or more measured device operational parameters;
a log determiner that identifies what operational information should be logged and identifies when operational information should be logged;
a log entry generator that generates the log entries; and
a queries component that queries various portions of the optoelectronic device for operational parameters.

8. A method for an optoelectronic device to persistently log operational data regarding an intelligent transmitter module within the optoelectronic device, the method comprising:
executing microcode from persistent memory within the optoelectronic device that directs the optoelectronic device to measure a set of device operational parameters of the intelligent transmitter module to obtain operational information of the intelligent transmitter module;
identifying first operational information based on at least one of the set of device operational parameter regarding an intelligent transmitter module within an optoelectronic device, the intelligent transmitter module comprising an hermetically sealed package including disposed therein a clock and data recovery circuit, a driver circuit integrated in a same chip as the clock and data recovery circuit, and an optical transmitter;
after identifying the first operational information, writing first log information representing the first operational information to the persistent memory;
identifying second operational information based on at least a second of the set of device operational parameter regarding the intelligent transmitter module; and
after identifying the second operational information, writing second log information representing the second operational information to the persistent memory.

9. A method in accordance with claim 8, wherein the method is performed by a microcontroller within the optoelectronic device, wherein the microcontroller and the persistent memory are integrated on the same chip.

10. A method in accordance with claim 8, wherein the first operational information represents one or more of a total operation time for the intelligent transmitter module, a number of times the intelligent transmitter module has been booted, an average operational time between boots, a total number of error conditions encountered in the intelligent transmitter module, an identification of one or more error conditions encountered in the intelligent transmitter module, and a categorization of the number of error conditions encountered in the intelligent transmitter module for a plurality of different error types.

11. A method in accordance with claim 8, wherein the second operational information further comprises an approximate time that at least one of the one or more measured operational parameters was measured.

12. A method in accordance with claim 8, wherein the set of device operational parameters of the intelligent transmitter module comprise one or more of a laser wavelength approximation, a laser temperature measurement, a supply voltage measurement, an intelligent transmitter module temperature measurement, an optical spectrum reshaper temperature measurement, a laser bias current measurement, a thermo electric cooler current measurement, a transmit power measurement, an acceleration measurement, and an end of life calculation for the intelligent transmitter module.

13. A method in accordance with claim 8, wherein the act of identifying first operational information is performed periodically with respect to the first operational information.

14. A method in accordance with claim 8, wherein the act of identifying first operational information comprises an act of identifying that an event indicative of the first operational information has occurred.

15. An optoelectronic device comprising the following:
an intelligent transmitter module comprising an hermetically sealed packaged including disposed therein a clock and data recovery circuit, a driver integrated in a same chip as the clock and data recovery circuit, and an optical transmitter;
a microcontroller; and
a persistent memory configurable to store log information and have microcode executed directly therefrom, wherein the microcontroller is configured to load the microcode a fraction at a time which directs the measurement of operational parameters of the intelligent transmitter module to identify operational information regarding the intelligent transmitter module, and to write log information representing the operational information to the persistent memory within the optoelectronic device.

16. An optoelectronic device in accordance with claim 15, wherein the microcontroller is included within the intelligent transmitter module on the same chip with as the clock and data recovery circuit and the driver and wherein the persistent memory is included within the intelligent transmitter module.

17. An optoelectronic device in accordance with claim 16, wherein the log information can be retrieved from the persistent memory via an input/output interface of the intelligent transmitter module, the input/output interface comprising one of a wired serial interface or a wireless interface.

18. An optoelectronic device in accordance with claim 15, wherein the operational information represents one or more of a total operational time for the intelligent transmitter module, a number of times the intelligent transmitter module has been booted, an average operational time between boots, a total number of error conditions encountered in the intelligent transmitter module, an identification of one or more error conditions encountered in the intelligent transmitter module, a categorization of the number of error conditions encountered in the intelligent transmitter module for a plurality of different error types, a laser wavelength approximation, a laser temperature measurement, a supply voltage measurement, an intelligent transmitter module temperature measurement, an optical spectrum reshaper temperature measurement, a laser bias current measurement, a thermo electric cooler current measurement, a transmit power measurement, an acceleration measurement, and an end of life calculation for the intelligent transmitter module.

19. An optoelectronic device in accordance with claim 15, wherein the optoelectronic device is one of a IG laser transceiver, a 2 G laser transceiver, a 4 G laser transceiver, an 8 G laser transceiver, a 10 G laser transceiver, or a laser transceiver suitable for communicating at data rates greater than 10 G.

20. An optoelectronic device in accordance with claim 15, wherein the optoelectronic device is one of an XFP laser transceiver, an SFP laser transceiver, or an SFF laser transceiver.

\* \* \* \* \*